J. J. KOVAR.
PLANTING SHOE WITH COVERING DISKS.
APPLICATION FILED JULY 14, 1909.
994,411.
Patented June 6, 1911.
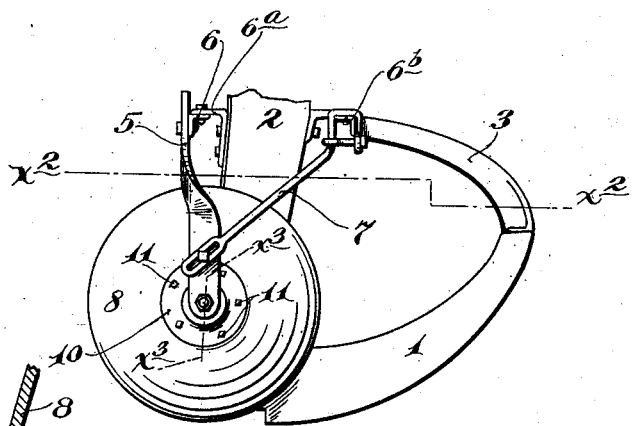
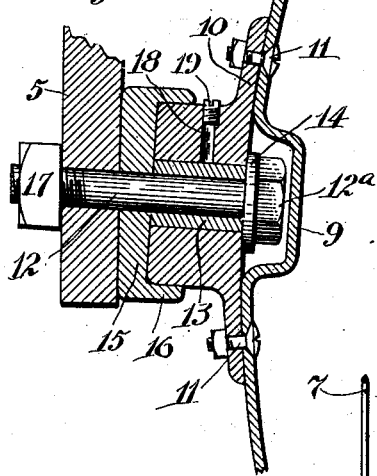
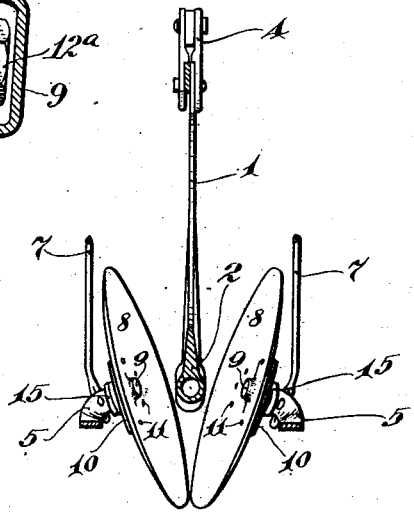
Witnesses:
E. C. Skinkle
L. L. Simpson
Inventor:
Joseph J. Kovar
By his Attorneys:
Williamson & Merchant

UNITED STATES PATENT OFFICE.

JOSEPH J. KOVAR, OF CLAREMONT, MINNESOTA.

PLANTING-SHOE WITH COVERING-DISKS.

994,411.  Specification of Letters Patent.  Patented June 6, 1911.

Application filed July 14, 1909.  Serial No. 507,460.

*To all whom it may concern:*

Be it known that I, JOSEPH J. KOVAR, a citizen of the United States, residing at Claremont, in the county of Dodge and State of Minnesota, have invented certain new and useful Improvements in Planting-Shoes with Covering-Disks; and I do hereby declare the following to be a full, clear, and exact description of the invention, such as will enable others skilled in the art to which it appertains to make and use the same.

My invention relates to planting machines wherein a shoe is employed to open up the furrow and has for its object to provide improved means for not only closing the furrow, but for depositing dirt in a ridge over the top of the closed furrow.

To the above ends, the invention consists of the novel devices and combinations of devices hereinafter described and defined in the claim.

I accomplish the main object of this invention by the provision of a pair of disks which are journaled to the shoe, back of the seed boot or spout thereof, and are arranged to diverge forwardly, so that they will throw the dirt inward and thereby close the furrow and form a ridge of the deposited dirt. Disks as hitherto applied to seed boots or disk drills and other seeding machines have been arranged to open the furrow and hence have been arranged to diverge rearwardly.

In the accompanying drawings, which illustrate the invention, like characters indicate like parts throughout the several views.

Referring to the drawings: Figure 1 is a view in side elevation showing a shoe seed boot, in connection with a pair of disks arranged in accordance with my invention, some parts being broken away; Fig. 2 is a transverse horizontal section taken on the line $x^2$ $x^2$ of Fig 1, some parts being broken away; and Fig. 3 is a detail in section on a large scale taken on the line $x^3$ $x^3$ of Fig. 1.

The numeral 1 indicates the furrow opening shoe and the numeral 2, the seed boot, which parts are directly connected at their lower extremities, and at their upper portions are connected by a bar 3.

The numeral 4 indicates a drag bar connection to the forward end of the shoe 1. The boot 2, is, of course, tubular and open both at top and bottom. Disk supporting arms 5 are rigidly secured at their upper ends to a short transverse bar 6, which in turn, is rigidly secured to the back of the seed boot 2, by means of a bracket $6^a$. Hitherto, it has been customary, in certain well-known forms of planters, to connect the seed boots 2 in pairs to the short transverse bars 6 and $6^b$.

In applying my invention, the lower ends of the disk supporting bars 5 are connected to transverse bars $6^b$ rigidly secured to the front of the seed boot 2, by truss rods 7. The covering disks 8, which as above stated, diverge forwardly, are also preferably set to diverge somewhat in an upwardly direction so that their greatest divergence will be approximately at an angle of 45 degrees forward. These disks are made without perforations at their axis, but are provided with laterally bulged portions 9 that project at the concave sides of the disks as best shown in Fig. 3. Each disk, just outward of its bulged portion 9, is connected to the peripheral flange of a bearing hub 10 preferably by small nut bolts 11, or by rivets if preferred.

The numeral 12 indicates a bolt, the head $12^a$ of which is placed in the bulged portion 9 before the bearing hub 10 is applied to the disk. A spacing sleeve 13 is preferably placed on the bolt 12 within the bearing hub 10 and the washer 14 is preferably interposed between the bolt head $12^a$ and the adjacent end of the said bearing sleeve. The bolt 12 is also passed through a beveled or wedge-shaped washer 15, and through the perforated lower coöperating end of one of the disk supporting arms 5. The washer 15 is placed with one side against the end of the said supporting arm 5 and with its other side against the adjacent ends of the bearing hub 10 and spacing sleeve 13. The washer 15 is preferably provided with an annular flange 16 and that surrounds the adjacent end of the bearing hub 10 and acts as a sand guard. The nut 17 on the threaded end of the bolt 12, when tightened, serves to tightly clamp the washers 14 and 15 and the spacing sleeve 13 together and in fixed positions in respect to the supporting arm 5, and the said sleeve 13 should be of such length that when the said bolt is tightened, as above stated, the bearing hub 10 will be free to rotate on the said spacing sleeve 13.

As is evident, the inclination of angularity of the two disks in respect to each other and in respect to vertical and horizontal lines may be varied by rotary adjustments of the beveled washers 15. These beveled washers are therefore important. The bearing hub 10, as shown, is provided with a radial oil hole 18 that is normally closed by a plug 19.

The device above described, while extremely simple, has in practice, been found highly efficient for the purposes had in view. The forwardly diverging disks at the rear of the seed boot and shoe pick up the dirt and throw the same inward, thereby closing the furrow and forming quite a high ridge which insures deep planting and a good deposit of soil on top of the planted seed. This, as is understood, is a much desired result.

What I claim is:

The combination with a furrow opening shoe and a seed boot rigidly connected to the rear portion of said shoe and having a pair of transversely extended bars, of disk supporting arms secured to one of said bars and depending therefrom, truss rods adjustably connecting the said supporting arms with the other of said bars, a pair of upwardly and forwardly diverging disks journaled to the inner faces of said supporting arms and operating to close the furrow onto the deposited seed, and means for adjusting said disks angularly with respect to said shoe, substantially as described.

In testimony whereof I affix my signature in presence of two witnesses.

JOSEPH J. KOVAR.

Witnesses:
 JAS. S. MARTIN,
 A. C. BELL.

---

Copies of this patent may be obtained for five cents each, by addressing the "Commissioner of Patents, Washington, D. C."